United States Patent
Weyerhaeuser et al.

(10) Patent No.: US 8,914,387 B2
(45) Date of Patent: Dec. 16, 2014

(54) CALCULATION MODELS USING ANNOTATIONS FOR FILTER OPTIMIZATION

(75) Inventors: Christoph Weyerhaeuser, Heidelberg (DE); Tobias Mindnich, Walldorf (DE); Daniel Baeumges, Viersen (DE); Gerrit Simon Kazmaier, Heidelberg (DE)

(73) Assignee: SAP AG, Walldorf (DE)

( * ) Notice: Subject to any disclaimer, the term of this patent is extended or adjusted under 35 U.S.C. 154(b) by 243 days.

(21) Appl. No.: 13/457,315

(22) Filed: Apr. 26, 2012

(65) Prior Publication Data

US 2013/0290354 A1 Oct. 31, 2013

(51) Int. Cl.
*G06F 7/00* (2006.01)
*G06F 17/30* (2006.01)

(52) U.S. Cl.
USPC .......................................................... 707/754

(58) Field of Classification Search
CPC ............ G06F 17/30; G06F 7/00; G06F 10/10
USPC ......... 707/705, 706, 713, 714, 715, 718, 754, 707/769
See application file for complete search history.

(56) References Cited

U.S. PATENT DOCUMENTS

| | | | |
|---|---|---|---|
| 6,484,162 B1 | 11/2002 | Edlund et al. | |
| 6,618,719 B1 | 9/2003 | Andrei | |
| 8,645,346 B2* | 2/2014 | Dumitru et al. | 707/705 |
| 2004/0024720 A1* | 2/2004 | Fairweather | 706/46 |
| 2006/0212418 A1 | 9/2006 | Dettinger et al. | |
| 2007/0011321 A1* | 1/2007 | Huntington et al. | 709/224 |
| 2008/0027788 A1* | 1/2008 | Lawrence et al. | 705/10 |
| 2008/0120129 A1* | 5/2008 | Seubert et al. | 705/1 |
| 2008/0183689 A1* | 7/2008 | Kubota et al. | 707/4 |
| 2009/0043762 A1* | 2/2009 | Shiverick et al. | 707/5 |
| 2010/0153430 A1* | 6/2010 | Mordvinov et al. | 707/769 |
| 2010/0306188 A1 | 12/2010 | Cunningham et al. | |
| 2011/0078129 A1* | 3/2011 | Chunilal | 707/706 |
| 2011/0131199 A1* | 6/2011 | Simon et al. | 707/714 |

(Continued)

FOREIGN PATENT DOCUMENTS

| | | |
|---|---|---|
| EP | 2386965 A1 | 11/2011 |
| EP | 2447858 A1 | 5/2012 |

OTHER PUBLICATIONS

Bizarro, Pedro et al., "Progressive Parametric Query Optimization", IEEE Transactions on Knowledge and Data Engineering, vol. 21, No. 4, Apr. 1, 2009.

(Continued)

*Primary Examiner* — Robert Beausoliel, Jr.
*Assistant Examiner* — Nicholas Allen
(74) *Attorney, Agent, or Firm* — Mintz Levin Cohn Ferris Glovsky and Popeo, P.C.

(57) ABSTRACT

A query statement is received that requires at least one calculated attribute. Thereafter, a data flow graph is generated that includes a plurality of nodes for executing the query. At least one of the nodes corresponds to the at least one calculated attribute and has at least one level of child nodes. The data flow graph is generated by generating at least one filter for each of the nodes corresponding to the at least one calculated attribute and by pushing down the generated filters to a corresponding child node. Once the data flow graph is generated, execution of the query can be initiated using the generated data flow graph. Related apparatus, systems, techniques and articles are also described.

18 Claims, 5 Drawing Sheets

(56) References Cited

U.S. PATENT DOCUMENTS

| | | | |
|---|---|---|---|
| 2012/0005190 A1* | 1/2012 | Faerber et al. | 707/718 |
| 2012/0011238 A1* | 1/2012 | Rathod | 709/223 |
| 2012/0109934 A1* | 5/2012 | Weyerhaeuser et al. | 707/713 |
| 2012/0265773 A1* | 10/2012 | McGlashan et al. | 707/754 |
| 2012/0317094 A1* | 12/2012 | Bear et al. | 707/714 |
| 2012/0323956 A1* | 12/2012 | Dumitru et al. | 707/769 |
| 2013/0138629 A1* | 5/2013 | Rehmattullah | 707/715 |
| 2013/0151692 A1* | 6/2013 | White | 709/224 |
| 2013/0152088 A1* | 6/2013 | Gkantsidis et al. | 718/100 |

OTHER PUBLICATIONS

Martinez-Medina, Lurdes Angelica et al., "Query optimization using case-based reasoning in ubiquitous environments", 2009 Mexican International Conference on Computer Science (ENC), Sep. 21, 2009.

European Search Report and Written Opinion dated Mar. 5, 2012, issued by the European Patent Office in connection with corresponding EP Application No. 11004965.7.

* cited by examiner

CALCULATION MODELS USING ANNOTATIONS FOR FILTER OPTIMIZATION

TECHNICAL FIELD

The subject matter described herein relates to calculation models using annotations for filter optimization, and in particular, optimized execution of filters by push-down of expressions through calculated attributes.

BACKGROUND

Performance of data flow between an application server and a database server is largely dependent on the scope and number of queries generated by the application server. Complex calculations can involve numerous queries of the database server which in turn can consume significant resources in connection with data transport as well as application server-side processing of transported data.

Complex queries of data sources can often be executed in several, if not many, different ways. In order to effect such queries in an efficient manner, data flow graphs for such queries can be optimized for a more rapid response time and/or to consume fewer processing resources. In the process of optimization, filters (e.g., WHERE statements, etc.) are typically pushed down nodes of the data flow graph as deep as possible. However, pushing a down a filter over a calculated attribute can be prohibitive because the corresponding logic defining the calculation needs to be reversed. Even if this logic is bidirectional, an automated reverse transformation can be complex. This problem is of major importance for enterprise software with integrated reporting respectively reporting on transactional data in which data cleansing, transformation and enrichment are done dynamically by means such as calculated attributes.

SUMMARY

In one aspect, a query statement is received that requires at least one calculated attribute. Thereafter, a data flow graph is generated that includes a plurality of nodes for executing the query. At least one of the nodes corresponds to the at least one calculated attribute and has at least one level of child nodes. The data flow graph is generated by generating at least one filter for each of the nodes corresponding to the at least one calculated attribute and by pushing down the generated filters to a corresponding child node. Once the data flow graph is generated, execution of the query can be initiated using the generated data flow graph.

The operation defined by the at least one node corresponding to the at least one calculated attribute can comprise a base attribute such that the generated filter is pushed down via the base attribute. The at least one calculated attribute can be replaced with an actual filter value and the base attribute can be changed based on this replacement.

The generated filters can each comprise multiple query parts. The multiple query parts can be dependent on operators utilized by the corresponding generated filter. At least one calculated attributed can be replaced with an actual filter value so that a new filter on top of the actual filter value is pushed down to the corresponding node. The at least one calculated attribute can include two or more rules that are chained. At least one of the generated filters pushed down to a corresponding child node can be duplicated at a corresponding parent node.

In another aspect, a query statement is received that requires at least one calculated attribute. A data flow graph comprising a plurality of nodes for executing the query is generated such that at least one of the nodes correspond to the at least one calculated attribute and has at least one level of child nodes. The data flow graph is generated by determining, for at least one calculated attribute, an inverse of a corresponding calculated expression and by pushing the inverse of the determined corresponding calculated expression down to a corresponding child node. Subsequently, execution of the query can be initiated using the generated data flow graph.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the current subject matter provides a new way to define an optimization filter rule as part of a calculated attribute that in turn defines how a filter can be pushed through the calculated attribute. The filter rule can be seen as an "inversion" of the expression which defines the calculated attribute and allows for the push down of filters in complex calculation models. By pushing down such filters, the size of intermediate results can be reduced so that query processing time can be reduced and/or fewer processing resources can be consumed.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
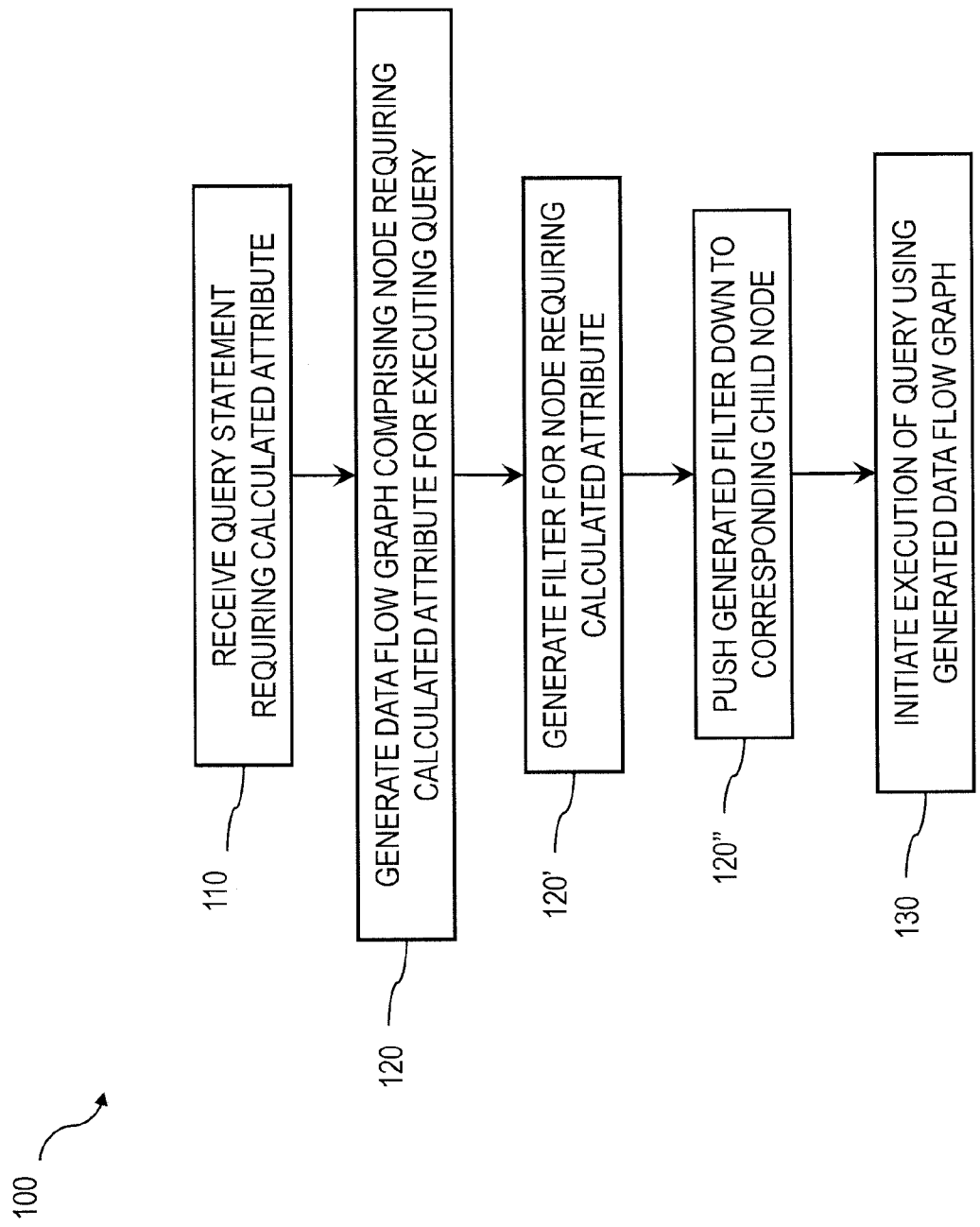
FIG. 1 is a process flow diagram illustrating a method of pushing-down of expressions through calculated attributes.

FIG. 1 is a process flow diagram 100 illustrating a method in which, at 110, a query statement requiring at least one calculated attribute is received. In response, at 120, a data flow graph is generated that comprises a plurality of nodes for executing the query with at least one of the nodes corresponding to the at least one calculated attribute and having at least one level of child nodes. The data flow graph is generated by generating, at 120', at least one filter for each of the nodes corresponding to the at least one calculated attribute and, at 120", pushing the generated filters down to a corresponding child node. Thereafter, execution of the query is initiated, at 130, using the generated data flow graph.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

Figure 2:
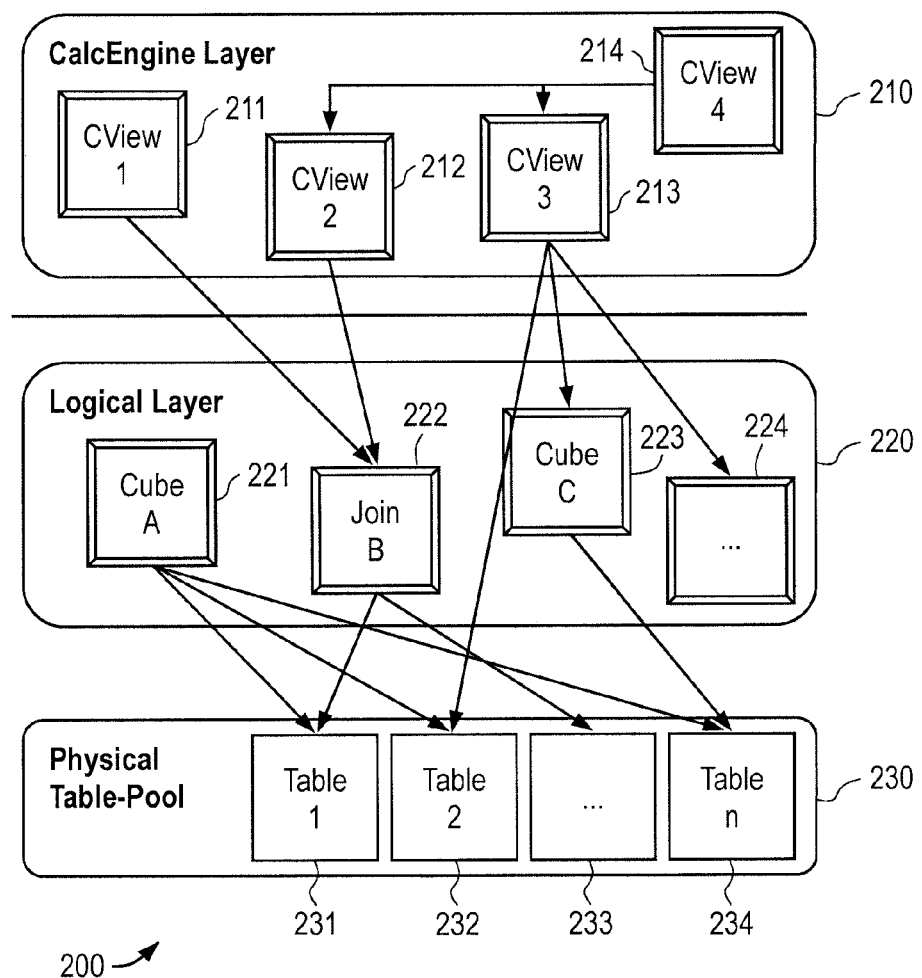
FIG. 2 is a diagram illustrating a calculation engine layer, a logical layer, a physical table pool and their interrelationship.

The current subject matter can be implemented, for example, in connection with a calculation engine environment such as that illustrated in the diagram 200 of FIG. 2. In FIG. 2, illustrated are a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP index) can be assigned roles (e.g., fact or dimension tables) and joined to form a star schema. It is also possible to form join indexes, which can act like database view in environments such as the Fast Search Infrastructure (FSI) by SAP AG.

Calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP indexes or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. Example environments for implementing calculation scenarios can be found, for example, in U.S. patent application Ser. No. 12/914,445, the contents of which are hereby fully incorporated by reference.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Figure 3:
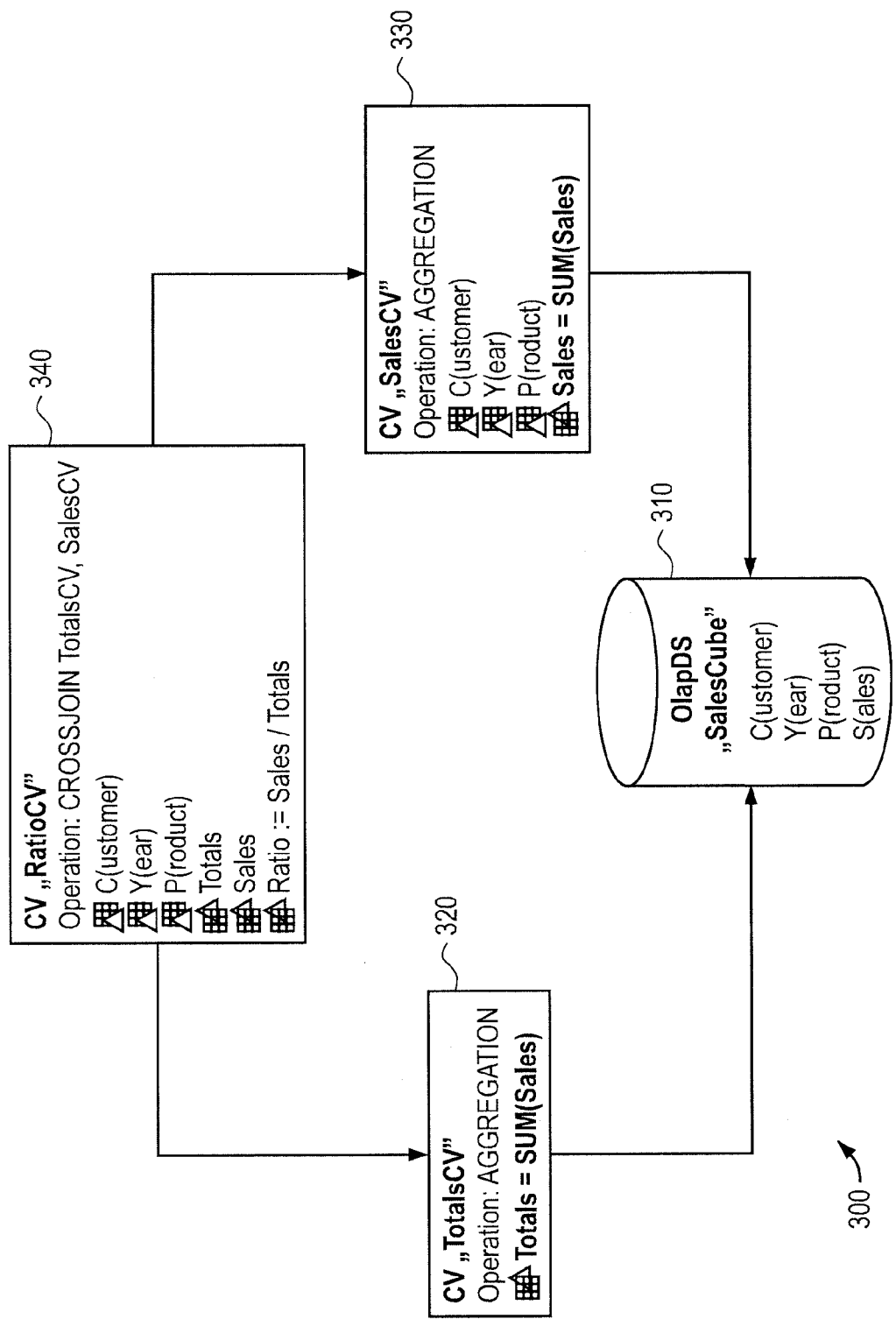
FIG. 3 is a diagram illustrating a first instantiation of a calculation scenario.

FIG. 3 is a diagram 300 illustrating an example of a calculation scenario that relates a number of sales to total sales. With conventional arrangements, such a query can be expressed with several SQL statements but not in a single statement, because for the calculation of the relation two aggregations at different aggregation levels are required. To calculate the number of sales, aggregation is performed by a requested GroupBy attribute. To calculate the sales total, all sales need to be aggregated. Previously this required two separate requests on different SQL view, and the final calculation had to be performed in the application (as opposed to database-side).

For this example, that data source is an OLAP cube "SalesCube" 330, which has the three dimensions Customer, Year, and Product as well as the measure Sales. As stated, this data source 310 can be entered as a special DataSource node in the logical layer 220 in the calculation scenario. The DataSource is now referenced from two calculation nodes. The calculation node TotalsCV 320 on the left side calculates the sales total, by simply summing the sales without any GroupBy attributes. The calculation node SalesCV 330 on the right side calculates the sales according to the GroupBys. To calculate their relationship, the two calculation nodes 320, 330 are joined with each other using a CrossJoin. In the calculation node RatioCV 340 after the join, all the attributes needed for the calculation are available and a new calculated attribute Ratio is provided.

Figure 4:
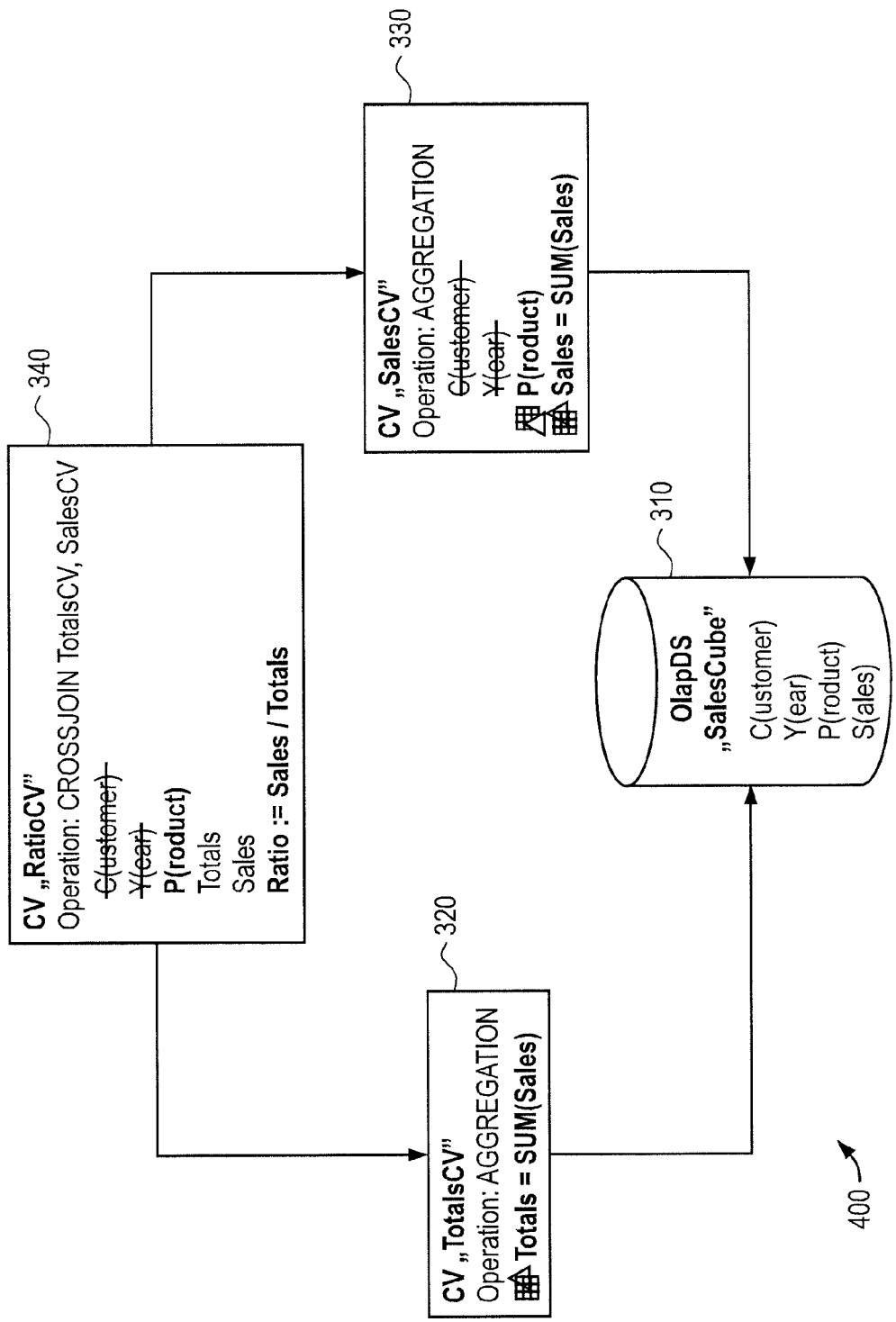
FIG. 4 is a diagram illustrating a second instantiation of a calculation scenario.

The implementation of FIG. 3 is a general calculation scenario. That is, if the calculation scenario is queried via a SQL statement which only requests product as GroupBy attribute, the model is appropriately instantiated and executed. FIG. 4 is a diagram 400 illustrating a variation in which not all of the attributes specified by the calculation nodes 330, 340 are required. In particular, the ratio calculation is for sales relative to total sales without regard to customer and year. In the instantiation, the unnecessary attributes Customer and Year are removed from the calculation nodes RatioCv 340 and SalesCV 330 which accelerates execution of the results (e.g., the ratio) because less data has to be touched (i.e., fewer attributes need to be searched/persisted, etc.).

Figure 5:
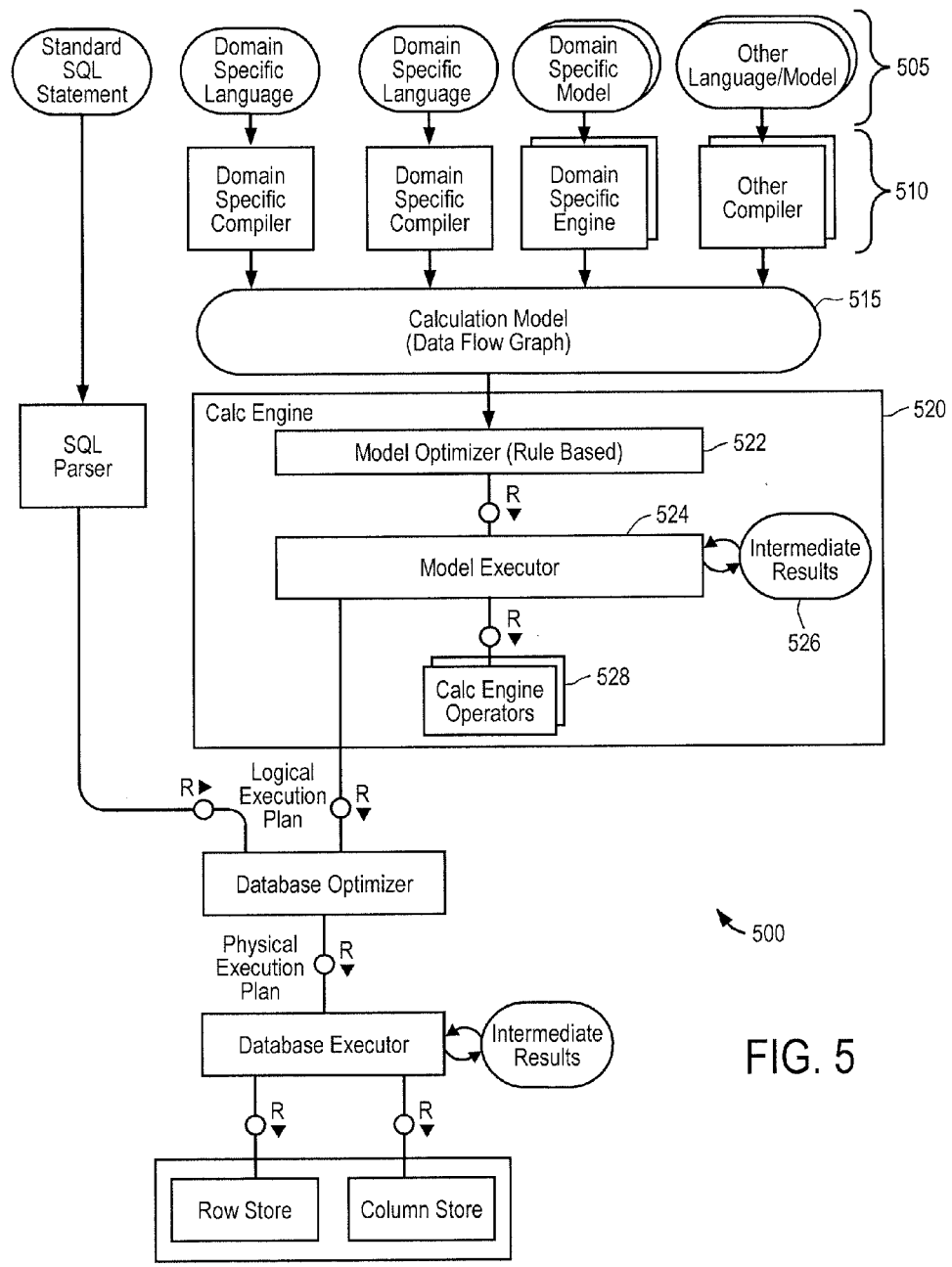
FIG. 5 is a diagram illustrating an architecture for processing and execution control.

FIG. 5 is a diagram 500 illustrating a sample architecture for request processing and execution control. As shown in FIG. 5, artifacts 505 in different domain specific languages can be translated by their specific compilers 510 into a common representation called a "calculation scenario" 515 (illustrated as a calculation model). To achieve enhanced performance, the models and programs written in these languages are executed inside the database server. This arrangement eliminates the need to transfer large amounts of data between the database server and the client application. Once the different artifacts 505 are compiled into this calculation scenario 515, they can be processed and executed in the same manner. The execution of the calculation scenarios 515 (i.e., data flow graphs) is the task of a calculation engine 520.

The calculation scenario 515 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 515 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 515 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 515 can be defined as part of database metadata and invoked multiple times. A calculation scenario 515 can be created, for example, by a SQL statement "ALTER SYSTEM ADD SCENARIO<xml OR json representing the scenario>". Once a calculation scenario 515 is created, it can be queried (e.g., "SELECT A, B, C FROM <scenario name>", etc.). In some cases, databases can have pre-defined calculation scenarios 515 (default, previously defined by users, etc.). The calculation scenarios 515 can be persisted in a repository (coupled to the database server) or in transient scenarios, the calculation scenarios 515 can be kept in-memory.

Calculation scenarios 515 are more powerful than traditional SQL queries or SQL views for many reasons. One reason is the possibility to define parameterized calculation schemas that are specialized when the actual query is issued. Unlike a SQL view, a calculation scenario 515 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 515 may contain an aggregation node containing all attributes. Later, the attributes for grouping can be supplied with the query. This allows having a predefined generic aggregation, with the actual aggregation dimensions supplied at invocation time. The calculation engine 520 can use the actual parameters, attribute list, grouping attributes, and the like supplied with the invocation to instantiate a query specific calculation scenario 515. This instantiated calculation scenario 515 is optimized for the actual query and does not contain attributes, nodes or data flows that are not needed for the specific invocation.

When the calculation engine 520 gets a request to execute a calculation scenario 515, it can first optimize the calculation scenario 515 using a rule based model optimizer 522. Examples for optimizations performed by the model optimizer can include "pushing down" filters and projections so that intermediate results 526 are narrowed down earlier, or the combination of multiple aggregation and join operations into one node. The optimized model can then be executed by a calculation engine model executor 524 (a similar or the same model executor can be used by the database directly in some cases). This includes decisions about parallel execution of operations in the calculation scenario 515. The model executor 524 can invoke the required operators (using, for example, a calculation engine operators module 528) and manage intermediate results. Most of the operators are executed directly in the calculation engine 520 (e.g., creating the union of several intermediate results). The remaining nodes of the calculation scenario 515 (not implemented in the calculation engine 520) can be transformed by the model executor 524 into a set of logical database execution plans. Multiple set operation nodes can be combined into one logical database execution plan if possible.

The calculation scenarios 515 of the calculation engine 520 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 520 to execute the calculation scenario 515 behind the calculation view. In some implementations, the calculation engine 520 and the SQL processor are calling each other: on one hand the calculation engine 520 invokes the SQL processor for executing set operations and SQL nodes and, on the other hand, the SQL processor invokes the calculation engine 520 when executing SQL queries with calculation views.

To allow filter push down through calculated attributes (i.e., moving a filter down to a child/success node of the data flow graph) it is necessary to define how such a filter can be pushed down. Two kinds of appropriate filter rules can be considered, namely evaluation and replacement. These filter rules can be used by the model optimizer 522 and/or as a model optimizer as described in co-pending application Ser. No. 13/457,330 filed on Apr. 26, 2012, the contents of which are hereby fully incorporated by reference.

Evaluation calcAttr:=intCol+1

The filter rule for this attribute can be calcAttr-1.

The base attribute is intCol. This means if a filter is set on calcAttr the value is changed according to the defined rule. The rule is evaluated and calculated.

After calculating the new value the filter is pushed down via its base attribute, intCol. For example, calcAttr=5 is the filter. The new filter value is calculated by replacing calcAttr with the actual filter value (here: 5) and changing the base attribute. The result would be intCol=4.

Replacement calcAttr:=dateToYear(date)

The filter rule for this attribute can be: date >='<calcAttr>0101' and date <='<calcAttr>1231'

In this case, the rule will result in a new filter containing multiple query parts, depending on the operator used in the filter. For example, calcAttr=2010 is the filter. <cal cAt tr> can be replaced by the actual value of the filter (here 2010) [e.g., by string replacement], and the new filter on top of date is pushed down.

So, the original filter, calcAttr=2010 can be replaced by the new filter date>'20100101' and date <='201201231'. The original filter calcAttr<2010 would be rewritten to date<='20101231'.

In general one calculated attribute can comprise more than one rule that are chained. In addition, it can be necessary to duplicate the filter in the sense that it will be pushed down on the one hand but will also stay on the current level on the other hand. This information can be indicated with a flag on the filter rule.

The main idea is to allow a user to define a push down logic for filters on calculated attributes which considers the business logic behind the calculation and the specific data model. This allows powerful optimizations which might result in significant performance improvements.

In another implementation, the inverse of the calculated expression can be automatically determined. This might be possible but in addition it is necessary to define if the filter should be "duplicated" in a way that it will still stay on the current level on the one hand and pushed down on the other hand. In some cases it even might not be possible to determine the inverse of an expression.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figure(s) and described herein do not require the particular order shown, or sequential order, to achieve desirable results. Other embodiments may be within the scope of the following claims.

What is claimed is:

1. A method for implementation by one or more data processor forming part of at least one computing system, the method comprising:
   receiving, by at least one data processor, a query statement requiring at least one calculated attribute;
   generating, by at least one data processor, a data flow graph comprising a plurality of nodes for executing the query, at least one of the nodes corresponding to the at least one calculated attribute and having at least one level of child nodes, the generating comprising:
      generating, by at least one data processor for each of the nodes corresponding to the at least one calculated attribute, at least one filter that is based on an inverse of a calculated expression corresponding to the at least one calculated attribute; and
   pushing, by at least one data processor, the generated filters down to a corresponding child node; and
   initiating, by at least one data processor, executing of the query using the generated data flow graph.

2. A method as in claim 1, wherein the operation defined by the at least one node corresponding to the at least one calculated attribute comprises a base attribute, the generated filter being pushed down via the base attribute.

3. A method as in claim 2, wherein at least one calculated attribute is replaced with an actual filter value and the base attribute is changed based on this replacement.

4. A method as in claim 1, wherein the generated filters each comprises multiple query parts.

5. A method as in claim 4, wherein the multiple query parts are dependent on operators utilized by the corresponding generated filter.

6. A method as in claim 5, wherein at least one calculated attributed is replaced with an actual filter value and a new filter on top of the actual filter value is pushed down to the corresponding node.

7. A method as in claim 1, wherein at least one calculated attribute comprises two or more rules that are chained.

8. A method as in claim 1, wherein at least one of the generated filters pushed down to a corresponding child node is duplicated at a corresponding parent node.

9. An article of manufacture comprising:
   computer executable instructions stored on non-transitory computer readable media, which, when executed by at least one data processor, causes the at least one data processor to perform operations comprising:
      receiving a query statement requiring at least one calculated attribute;
      generating a data flow graph comprising a plurality of nodes for executing the query, at least one of the nodes corresponding to the at least one calculated attribute and having at least one level of child nodes, the generating comprising:
         generating, for each of the nodes corresponding to the at least one calculated attribute, at least one filter that is based on an inverse of a calculated expression corresponding to the at least one calculated attribute; and
      pushing the generated filters down to a corresponding child node; and
   initiating executing of the query using the generated data flow graph.

10. An article as in claim 9, wherein the operation defined by the at least one node corresponding to the at least one calculated attribute comprises a base attribute, the generated filter being pushed down via the base attribute.

11. An article as in claim 10, wherein at least one calculated attribute is replaced with an actual filter value and the base attribute is changed based on this replacement.

12. An article as in claim 9, wherein the generated filters each comprises multiple query parts.

13. An article as in claim 12, wherein the multiple query parts are dependent on operators utilized by the corresponding generated filter.

14. An article as in claim 13, wherein at least one calculated attributed is replaced with an actual filter value and a new filter on top of the actual filter value is pushed down to the corresponding node.

15. An article as in claim 9, wherein at least one calculated attribute comprises two or more rules that are chained.

16. An article as in claim 9, wherein at least one of the generated filters pushed down to a corresponding child node is duplicated at a corresponding parent node.

17. A method for implementation by one or more data processor forming part of at least one computing system, the method comprising:
- receiving, by at least one data processor, a query statement requiring at least one calculated attribute;
- generating, by at least one data processor, a data flow graph comprising a plurality of nodes for executing the query, at least one of the nodes corresponding to the at least one calculated attribute and having at least one level of child nodes, the generating comprising:
  - determining, by at least one data processor for at least one calculated attribute, an inverse of a corresponding calculated expression;
  - pushing, by at least one data processor, the inverse of the determined corresponding calculated expression down to a corresponding child node, wherein at least one calculated attributed is replaced with an actual filter value and a new filter on top of the actual filter value is pushed down to the corresponding node;
- initiating, by at least one data processor, executing of the query using the generated data flow graph.

18. A method as in claim 17, wherein at least one calculated attribute comprises two or more rules that are chained.

* * * * *